United States Patent [19]
Weiss

[11] 4,033,517
[45] July 5, 1977

[54] DEVICE FOR GRANULATING THIN-WALLED PLASTIC WASTES INTO PLASTIC GRANULATED MATERIAL

[76] Inventor: Helmut Weiss, Weiherstrasse 10, 6340 Dillenburg-Manderbach, Germany

[22] Filed: July 21, 1975

[21] Appl. No.: 597,472

[30] Foreign Application Priority Data
Sept. 5, 1974 Germany .......................... 2442497

[52] U.S. Cl. ............................................. 241/46.11
[51] Int. Cl.² ....................................... B02C 13/06
[58] Field of Search ................. 241/38, 41, 42, 43, 241/46.08, 46.11, 46.17, 65, 191, 195, 251, 253, 261

[56] References Cited
UNITED STATES PATENTS

| 3,342,425 | 9/1967 | Morton | 241/46.11 |
| 3,455,516 | 7/1969 | Hoch | 241/46.17 |
| 3,510,067 | 5/1970 | Beck et al. | 241/65 X |
| 3,602,440 | 8/1971 | Morden et al. | 241/46.11 |
| 3,717,307 | 2/1973 | Beck | 241/46.11 X |
| 3,833,178 | 9/1974 | Beck | 241/46.11 X |

Primary Examiner—Granville Y. Custer, Jr.
Attorney, Agent, or Firm—Woodhams, Blanchard and Flynn

[57] ABSTRACT

A device for granulating thin-walled plastic material into plastic granulated material. The device is composed of a rotating tool which is arranged closely above the bottom of a container. The tool produces frictional heat when moved relative to the material in the container. More specifically, the tool has at least two rotatable shafts, both of which are equipped with beaters thereon. The peripheral circles described by the outer ends of the beaters come close together or are overlapped, and, when in the overlapped condition, are vertically offset from one another.

9 Claims, 2 Drawing Figures

DEVICE FOR GRANULATING THIN-WALLED PLASTIC WASTES INTO PLASTIC GRANULATED MATERIAL

FIELD OF THE INVENTION

The invention relates to a device for crushing, subsequent plastification and then following agglomeration of thin-walled wastes, in particular foils, of thermoplastic plastics, comprising a stationary container and a rotatable crushing tool which is arranged closely above the container bottom, which crushing tool is also used to produce frictional heat.

BACKGROUND OF THE INVENTION

In devices of this type, it is possible to further process thin-walled wastes of thermoplastic plastics, as for example foil residues, shopping bags or wastes which are created during blowing of plastics, to a plastic granulated material which can be used over again. At suitably high drive powers for the crushing tool, it is possible to obtain the temperature which is required for the plastification exclusively by producing frictional heat, which is created by the friction that exists between the tool and the wastes. This method for plastification of plastic wastes is known (German Pat. No. 1,118,959, British Pat. No. 970,822).

Also a device of the above-mentioned type is known (German AUS No. 1,679,834, corresponds to U.S. Pat. No. 3,510,067), which has a cylindrical container, above the bottom of which, at a small distance from same, there is rotatably arranged a beating tool which has two beaters offset relative to another by 180° and the beaters are equipped with knives. Crushing members are arranged on the container wall, which crushing members lie approximately in the same plant as the beaters. This known device requires a relatively long time for processing a charge of plastic wastes to granulated material because the circulation of the wastes in the container is relatively slow. The required driving power is great in relationship to the amount of heat required for plastification because the friction heat is created for a good part during a pressing of the plastic between the beaters and the crushing tools and for an important part is discharged outwardly through the crushing members, which for the purpose of adjustability extend through the container wall.

The basic purpose of the invention is to further develop a device of the above-mentioned type so that at a given processing output of the device, the power need for the drive of the crushing tools is less than in the conventional device.

This purpose is attained according to the invention by providing a crushing tool having at least two rotatable shafts, which are both equipped with beaters, wherein the peripheral circles described by the outer ends of the beaters, as viewed from the top, lie closely together or are overlapped and, when overlapped, the beaters of adjacent shafts are vertically offset relative to one another.

In such a constructed device, the crushing operation no longer takes place near the container wall but where the beaters approach one another. If the beaters rotate in the same directions, as this is preferably the case, there is created a movement against one another like a cutting movement of a scissor. Thus, a very good crushing action is achieved. The conversion of mechanical energy into frictional heat does not take place near the container wall as in the conventional device, so that also the heat discharge to the outside is less. The required driving power for the crushing tools is less than in the conventional device because the cutting operation is better and the heat discharge to the outside is reduced. In the cutting zone, namely in the area in which the peripheral circles contact or intersect, there is also created a type of a suction action, which is favorable for the circulation of the wastes in the container, through which are achieved shorter processing times for a given charge. By using more than one beater knife, the structural height is also reduced.

Each shaft is driven by a separate motor which runs independently from a drive motor for the other shaft. Preferably, the beaters are mounted directly on the motor shaft. However, it is also possible for the shafts to be coupled to one another, preferably so that they have the same rotational speeds and the beaters simultaneously closely approach one another or are overlapped at an overlapping zone for the peripheral circles. Thus, a maximum of cutting movements is achieved. However, the practical test has shown that a mechanical coupling of the shafts is not needed and this has the advantage of a substantial simplification and reduction in the price of the construction.

Two beaters which are offset against one another at 180° can be arranged on each shaft. However, it is also possible to have more than two beaters per shaft. The beaters may have cutting edges of a conventional manner, which are preferably provided on exchangeable and turnable knives, which are sharpened on all sides.

It has been proven to be advantageous for the beaters to have cutting edges at their outer ends, preferably straight cutting edges, which extend substantially perpendicular to the radial direction. The great effectiveness of these outer cutting edges is mainly due to the fact that the plastic wastes, during the movement of the two beaters against one another, are gripped between said beaters.

In a preferred embodiment of the invention, the crushing tool has two shafts and the container wall has an oval cross-sectional shape, which is composed of two semicircles which are spaced a small distance from the peripheral circles of the beaters and of straight portions connecting the semicircular portions. The container can also be composed of two U-shaped sheet metal parts joined together. This design can be constructed easily and inexpensively. In the case of a greater need of processing output, it is possible, however, to provide also more than two shafts with beaters.

BRIEF DESCRIPTION OF THE DRAWING

One exemplary embodiment of the invention is illustrated in the drawing, in which.

DETAILED DESCRIPTION

Figure 1:
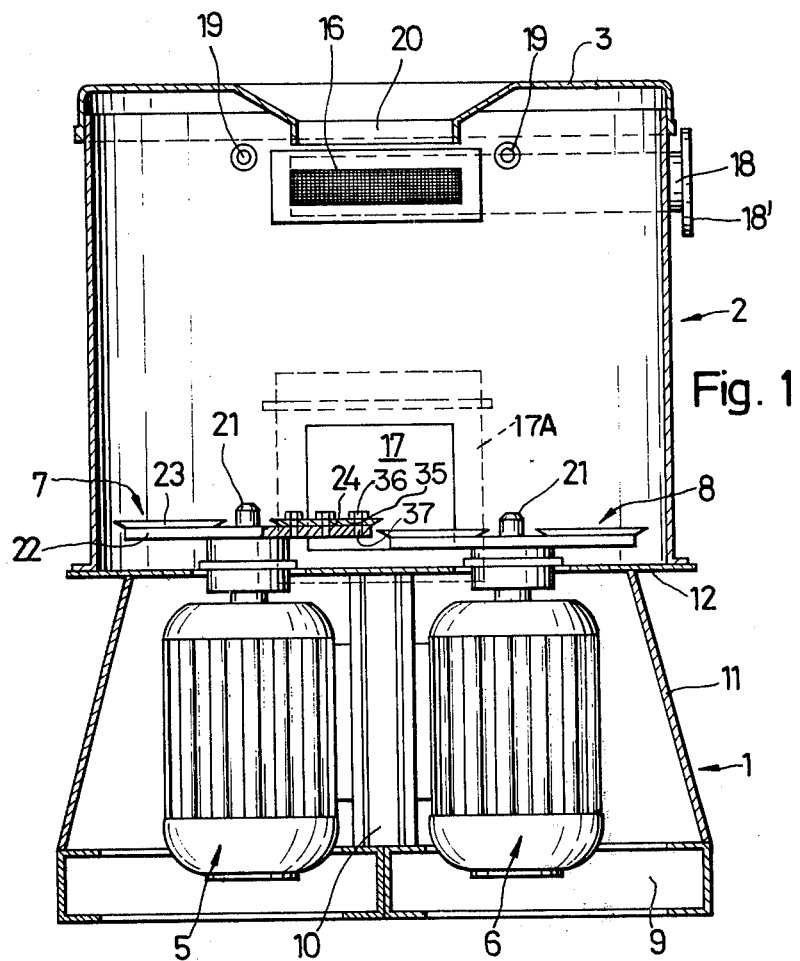
FIG. 1 is a vertical cross-sectional view of a device according to the invention.

The main parts of the granulating device are a frame 1, a container 2 having a lid 3, two drive motors 5 and 6 and beater members 7 and 8 secured to the output shafts of the motors. The structure of these individual parts and their cooperation will be described more in detail hereinbelow.

The frame 1 includes a base frame 9 having an upwardly projecting motor carrier member 10 and external walls 11. The motor carrier member 10 and the walls 11 together support a horizontal plate 12 which forms the bottom of the container 2.

Figure 2:
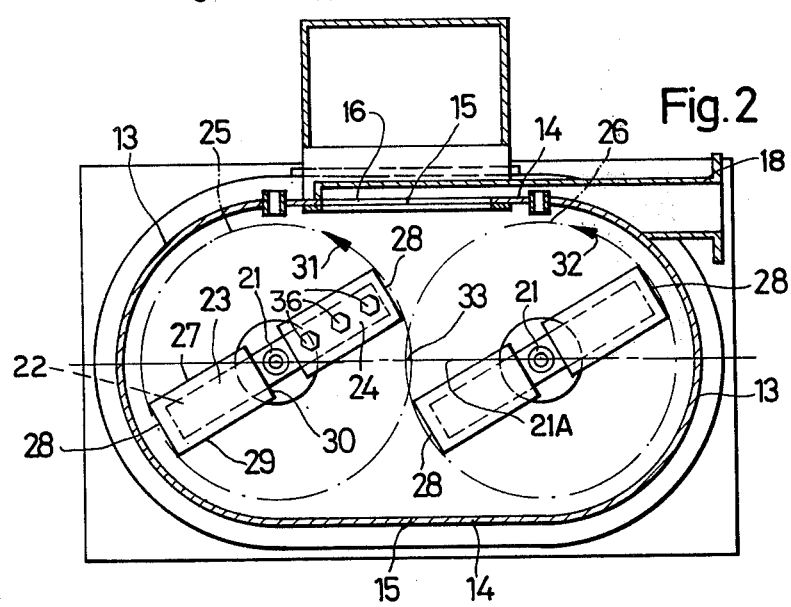
FIG. 2 is a top view of the device with the lid removed.

The container 2 has, as is shown in the top view according to FIG. 2, an oval shape. The horizontal cross section of the container is composed of two semicircles 13 and two straight pieces 14. The container wall may be composed of two U-shaped bent metal plates, which are welded together at 15. An opening 16 is provided in the upper zone of the container and is covered by a screening plate, which opening opens out into a suction pipe 18. A not illustrated blower is connected to the flange 18' of the suction pipe 18 for drawing steam out of the container, the steam being formed from the cooling water which is supplied through injection openings 19. A closable discharge opening 17 is provided in the lower area of the container. The slide closure member 17A is shown in broken lines in FIG. 1.

A large central opening 20 is provided in the lid 3, through which plastic wastes which are to be processed are filled into the container 2.

The drive motors 5,6 are vertically adjustable on the motor carrier member 10. The motor shafts are positioned vertically. The beater member 7 on the motor 5 consists of a knife carrier 22, which is fixedly connected to the motor shaft 21, having knives 23 and 24 mounted thereon. The knives 23,24 have, as can be seen from the top view of FIG. 2, a rectangular shape. All four sides of this rectangular shape are sharpened to a cutting edge, which can be seen from the side view of FIG. 1. Accordingly, each knife has four cutting edges 27 to 30 so that in the case of a direction of rotation indicated by the arrows 31,32, the cutting edges 29 and 28 will be mainly active. The structure for securing the knives is shown only in association with the example of the knife 24. Three holes 35 are provided in each knife and receive screws 36 therein and extend therethrough. The screws 36 are screwed into threaded holes 37, for example, in the knife carrier 22. After unscrewing the screws 36, the knives can be removed and replaced with other ones or can be turned and again secured so that (viewed on the knife 23) the edge 30 assumes the position of the edge 28 and the edge 27 the position of the edge 29. The cutting edges 28 extend perpendicular to the radical direction. The beater member 8 is constructed accordingly.

The peripheral circles 25, 26 which are described by the outer corners of the knives 23,24, are indicated by broken lines in FIG. 2. In the illustrated exemplary embodiment, a slight overlapping of these peripheral circles exists to define a zone 33 at a place where the peripheral circles 31, 32 intersect a line 21A connecting the axes of the two shafts 21. In order for the knives not to be able to strike one another, the beater member 7 is arranged slightly higher than the beater member 8, as is clearly shown in FIG. 1.

As can be seen from the arrows 31,32 indicating the direction of rotation, the shafts of the motors 5 and 6 rotate in the same direction of rotation.

OPERATION

The device operates as follows:

Plastic wastes which are to be granulated and moved through the opening 20 into the container with the lid 3 being in the closed position. The motors 5 and 6 are already running. The beaters are moved scissorlike against one another in the overlapped zone 33 of the peripheral circles 25,26 to cause the plastic to be cut up between the cutting edges, in particular between the front cutting edges 29. Also, and due to the mere impact effect of the knives which rotate at a high speed of rotation, a crushing takes place. Strong frictional forces exist and the heat produced thereby finally softens the thermoplastic plastic material. Also during the crushing and heating operation, further material can be supplied through the opening 20. Since the container is substantially closed off by the lid 3, there exists no danger of injury by the rotating knives. In order to now control the transition into a granulate condition, cooling medium can be injected through the openings 19. The steam which is produced by evaporation of the cooling medium is sucked off through the opening 16 and the suction pipe 18 by the not illustrated suction blower. With the aid of the cooling medium, a suitable cooling speed and thus a desired granulation is obtained. The finished granulated material is removed through the opening 17.

A suction action exists in the overlapped zone 33, which effects a circulation of the plastic wastes. To achieve an optimum circulation effect, the most favorable values for the distance of the beater members from the bottom 12 and a most favorable value for the elevational distance between the beater members 7 and 8 can be adjusted by testing. To adjust these distances, shims of a suitable thickness are inserted below the knives 23, 24 for example. Also possible would be a vertical adjustment of the motors 5,6 by moving the motors 5,6 lengthwise with respect to the motor carrier member 10.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. A device for crushing, subsequent plastification and then following agglomeration of thin-walled wastes of thermoplastic plastics having a stationary container and rotatable crushing tool means which is arranged adjacent and above the bottom wall of said container, said crushing tool means being used to produce frictional heat, comprising the improvement wherein said crushing tool means comprises at least two rotatable shafts having beaters thereon and rotatable therewith, wherein the peripheral circles described by the outer ends of said beaters are closely adjacent to effect said crushing of said wastes at a location between the place of intersection of said peripheral circles with a line joining the axes of said two rotatable shafts.

2. The improved device according to claim 1, wherein said shafts have the same directions of rotation.

3. The improved device according to claim 1, wherein each shaft is driven by a separate motor which runs independently of the other.

4. The improved device according to claim 1, wherein on each shaft there are arranged two beaters which are offset relative to one another at 180°.

5. The improved device according to claim 1, wherein said beaters include a knife carrier having knife members with cutting edges thereon, said knife members being exchangeable and turnable on said knife carrier, said knife members being sharpened on all sides.

6. The improved device according to claim 1, wherein said beaters have cutting edges on their radially outer ends which extend substantially perpendicularly to the radial direction.

7. The improved device according to claim 1, wherein said crushing tool means has two shafts and said container has an oval cross-sectional shape and is composed of two semicircular shaped members which are spaced a small distance from said peripheral circles and of straight portions which connect said semicircular shaped members.

8. The improved device according to claim 1, wherein said beaters are vertically offset from one another; and wherein said peripheral circles, when viewed in a direction parallel to said axes of said shafts, intersect.

9. The improved device according to claim 8, wherein said peripheral circles intersect and overlap; and wherein the boundary of a zone wherein said crushing occurs is defined by said peripheral circles between the points of intersection of said overlapped peripheral circles.

* * * * *